United States Patent
Monnerie

(10) Patent No.: US 7,278,457 B2
(45) Date of Patent: *Oct. 9, 2007

(54) AIRCRAFT TIRE

(75) Inventor: Christian Monnerie, Clermont-Ferrand (FR)

(73) Assignee: Michelin Recherche Et Technique S.A., Granges-Paccot (CH)

( * ) Notice: Subject to any disclaimer, the term of this patent is extended or adjusted under 35 U.S.C. 154(b) by 127 days.

This patent is subject to a terminal disclaimer.

(21) Appl. No.: 11/159,243

(22) Filed: Jun. 23, 2005

(65) Prior Publication Data

US 2005/0274443 A1    Dec. 15, 2005

Related U.S. Application Data

(63) Continuation of application No. PCT/EP03/14652, filed on Dec. 19, 2003.

(30) Foreign Application Priority Data

Dec. 23, 2002  (FR)  .................................. 02 16689

(51) Int. Cl.
  *B60C 15/00* (2006.01)
  *B60C 15/06* (2006.01)
  *B60C 9/00* (2006.01)
(52) U.S. Cl. .................. 152/539; 152/540; 152/547; 152/550; 152/555
(58) Field of Classification Search ................ 152/539, 152/540, 542, 547, 550, 555
  See application file for complete search history.

(56) References Cited

U.S. PATENT DOCUMENTS 4,832,102 A    5/1989   Domchick 5,702,548 A    12/1997  Arnaud et al.
2004/0206439 A1  10/2004  Roget et al.

FOREIGN PATENT DOCUMENTS

| EP | 582 196      | 2/1994 |
| WO | WO 02/00452  | 1/2002 |
| WO | WO 02/00456  | 1/2002 |

*Primary Examiner*—Justin R. Fischer
(74) *Attorney, Agent, or Firm*—Buchanan Ingersoll & Rooney PC

(57) ABSTRACT

An aircraft tire has an inflation pressure greater than 9 bar and a deflection greater than 30%. The tire includes a crown, two sidewalls and two beads, a carcass reinforcement anchored in the two beads and a crown reinforcement. The carcass reinforcement includes at least one circumferential alignment of reinforcement elements and the mechanism for anchoring the reinforcement elements within each bead includes circumferentially oriented reinforcement elements axially bordering the circumferential alignments of said reinforcement elements of the carcass reinforcement. The reinforcement elements of the carcass reinforcement and the circumferentially oriented reinforcement elements are separated from each other by a bonding rubber mix of very high elasticity modulus. The circumferentially oriented reinforcement elements are in the form of cables having a penetrability of between 80 and 100%, the breaking load of the cables being greater than 150 daN, and the cables having an elongation at break greater than 4%.

20 Claims, 6 Drawing Sheets

AIRCRAFT TIRE

This application is a continuation of International Application Serial No. PCT/EP2003/014652 filed on Dec. 19, 2003, and which published on Jul. 8, 2004 under Document WO 2004/056589.

BACKGROUND

The invention relates to an aircraft tire. Aircraft tires are distinguished in particular by the combination of an inflation pressure greater than 9 bar and a relative deflection greater than 30%.

The deflection of a tire is defined by the radial deformation of the tire, or variation in the radial height, when it changes from a non-loaded state to a statically loaded state, under rated load and pressure conditions.

It is expressed in the form of a relative deflection, defined by the ratio of this variation in the radial height of the tire to half the difference between the external diameter of the tire and the maximum diameter of the rim measured on the hook. The external diameter of the tire is measured statically in a non-loaded state at the rated pressure.

The reinforcement armature or reinforcement of tires and in particular of aircraft tires is currently—and most frequently—constituted by stacking one or more plies conventionally referred to as "carcass plies", "crown plies", etc. This manner of designating the reinforcement armatures originates from the manufacturing process, which consists of producing a series of semi-finished products in the form of plies, provided with cord reinforcing threads which are frequently longitudinal, which are subsequently assembled or stacked in order to build a tire blank. The plies are produced flat, with large dimensions, and are subsequently cut according to the dimensions of a given product. The plies are also assembled, in a first phase, substantially flat. The blank thus produced is then shaped to adopt the toroidal profile typical of tires. The semi-finished products referred to as "finishing" products are then applied to the blank, in order to obtain a product ready to be vulcanized.

Such a type of "conventional" process involves, in particular for the phase of manufacture of the blank of the tire, the use of an anchoring element (generally a bead wire), used for anchoring or holding the carcass reinforcement in the zone of the beads of the tire. Thus, in this type of process, a portion of all the plies constituting the carcass reinforcement (or only a part thereof) is turned up around a bead wire arranged in the tire bead. In this manner, the carcass reinforcement is anchored in the bead.

The fact that this conventional type of process is becoming more widespread in the industry, despite numerous variants in the manner of producing the plies and assemblies, has led the person skilled in the art to use a vocabulary modeled on the process; hence the generally accepted terminology, comprising in particular the terms "plies", "carcass", "bead wire", "shaping" to designate the change from a flat profile to a toroidal profile, etc.

There are nowadays tires which do not, properly speaking, comprise "plies" or "bead wires" in accordance with the preceding definitions. For example, document EP 0 582 196 describes tires manufactured without the aid of semi-finished products in the form of plies. For example, the reinforcement elements of the different reinforcement structures are applied directly to the adjacent layers of rubber mixes, the whole being applied in successive layers to a toroidal core the form of which makes it possible to obtain directly a profile similar to the final profile of the tire being manufactured. Thus, in this case, we no longer find "semi-finished products", nor "plies", nor "bead wires". The base products, such as the rubber mixes and the reinforcement elements in the form of cords or filaments, are applied directly to the core. As this core is of toroidal form, the blank no longer has to be shaped in order to change from a flat profile to a profile in the form of a torus.

Furthermore, the tires described in this document do not have the "conventional" upturn of the carcass ply around a bead wire. This type of anchoring is replaced by an arrangement in which circumferential cords are arranged adjacent to said sidewall reinforcement structure, the whole being embedded in an anchoring or bonding rubber mix.

There are also processes for assembly on a toroidal core using semi-finished products specially adapted for quick, effective and simple laying on a central core. Finally, it is also possible to use a mixture comprising both certain semi-finished products to produce certain architectural aspects (such as plies, bead wires, etc.), whereas others are produced from the direct application of mixes and/or reinforcement elements.

In the present document, in order to take into account recent technological developments both in the field of manufacture and in the design of products, the conventional terms such as "plies", "bead wires", etc., are advantageously replaced by neutral terms or terms which are independent of the type of process used. Thus, the term "carcass-type reinforcing thread" or "sidewall reinforcing thread" is valid as a designation for the reinforcement elements of a carcass ply in the conventional process, and the corresponding reinforcement elements, generally applied at the level of the sidewalls, of a tire produced in accordance with a process without semi-finished products. The term "anchoring zone", for its part, may equally well designate the "traditional" upturn of a carcass ply around a bead wire of a conventional process and the assembly formed by the circumferential reinforcement elements, the rubber mix and the adjacent sidewall reinforcement portions of a bottom zone produced with a process with application to a toroidal core.

In what follows, "linear density" is understood to mean the weight in grammes of one thousand meters of a reinforcing thread. The linear density is expressed in tex. The stress to which a reinforcing thread is subjected or the modulus of this reinforcing thread are expressed in "cN/tex", cN meaning centinewton.

"Axial" is understood to mean a direction parallel to the axis of rotation of the tire; this direction may be "axially inner" when it is directed towards the inside of the tire and "axially outer" when it is directed towards the outside of the tire.

"Radial" is understood to mean a direction perpendicular to the axis of rotation of the tire and passing through this axis of rotation. This direction may be "radially inner" or "radially outer" depending on whether it is directed towards the axis of rotation or towards the outside of the tire.

"Elasticity modulus" of a rubber mix is understood to mean a secant modulus of extension at 10% deformation and at ambient temperature.

As far as the metal cords or metal cables are concerned, the measurements of breaking load (maximum load in N), tensile strength (in MPa) and elongation at break (total elongation in %) are carried out under tension in accordance with Standard ISO 6892 of 1984.

As far as the rubber compositions are concerned, the measurements of modulus are carried out under tension in accordance with Standard AFNOR-NFT-46002 of September 1988: the nominal secant modulus (or apparent stress, in MPa) at 10% elongation is measured in a second elongation (i.e. after an accommodation cycle) (normal conditions of temperature and relative humidity in accordance with Standard AFNOR-NFT-40101 of December 1979).

As far as the textile cords or textile cables are concerned, the mechanical properties are measured on fibers which have been subjected to prior conditioning. "Prior conditioning" is understood to mean storage of the fibers for at least 24 hours, before measurement, in a standard atmosphere in accordance with European Standard DIN EN 20139 (temperature of 20±2° C.; relative humidity of 65±2%). The mechanical properties in extension (tenacity, modulus, elongation and energy at break) are measured in known manner using a ZWICK GmbH & Co (Germany) 1435-type or 1445-type tension machine. The fibers, after having received a slight prior protective twist (helix angle of approximately 6°), are subjected to traction over an initial length of 400 mm at a nominal speed of 200 mm/min. All the results are an average of 10 measurements.

U.S. Pat. No. 4,832,102 describes an aircraft tire comprising a crown, two sidewalls and two beads, a carcass reinforcement and a crown reinforcement in which the carcass reinforcement comprises two circumferential alignments of reinforcing threads of high elasticity modulus, anchored in the two beads, and the crown reinforcement comprises at least one working block with at least one ply of reinforcing threads of high elasticity modulus. The carcass reinforcement is anchored in the beads by turning up, around a bead wire, the two circumferential alignments of first reinforcing threads of high elasticity modulus.

SUMMARY OF THE INVENTION

The subject of the invention is an aircraft tire, the carcass reinforcement of which is anchored by reinforcement elements arranged circumferentially in accordance with techniques for the manufacture of tires of the type on a toroidal core.

Thus patent WO 02/00456 has already described aircraft tires, the carcass reinforcement of which comprises two or three circumferential alignments of reinforcement elements of high elasticity modulus and means for anchoring said reinforcement elements, constituting the carcass reinforcement, within each bead. The anchoring means according to this document are formed by circumferentially oriented cords axially bordering the circumferential alignments of the reinforcement elements of the carcass reinforcement, said reinforcement elements of the carcass reinforcement and the circumferentially oriented cords being separated by a bonding rubber mix of very high elasticity modulus. The use of cords makes it possible to obtain satisfactory rigidity with a bulk of the bead which is reduced as much as possible; the compactness of the bead is of paramount importance for aircraft tires in reducing the consequences of heating of said beads.

Aircraft tires must withstand extreme conditions during service, in particular in terms of applied load and speed, taking into account their low weight and size. As a result, despite their very high inflation pressures, greater than 9 bar, their loading or deflection during operation may commonly reach values double those observed for heavy-vehicle tires or passenger-car tires.

During takeoff, very high speeds, of the order of 350 km/hour or even 450 km/hour, are achieved, and hence heating conditions exist which are also very severe.

All these conditions are particularly disadvantageous for the endurance of the beads of these tires.

The substitution in the tire of anchoring of the carcass reinforcement with an upturn around a bead wire by anchoring by means of circumferential reinforcement cords coupled to the reinforcement elements of the carcass reinforcement by a layer of mix of high elasticity modulus does not involve any degeneration of said structure, on the contrary.

However, tests performed in the context of the production of such tires have shown that the placement of said circumferential reinforcement cords in the uncured state becomes a deciding factor as far as the productivity rates using manufacturing processes of the type on a toroidal core are concerned.

The inventors have set themselves the task of improving the production yields of aircraft tires produced using techniques of the type on a toroidal core and in particular of facilitating the laying in the uncured state and improving the holding of the reinforcement elements arranged circumferentially to form the anchoring zone of the carcass reinforcement.

This aim has been achieved according to the invention by an aircraft tire the inflation pressure of which is greater than 12 bar, comprising a crown, two sidewalls and two beads, a carcass reinforcement anchored in the two beads and a crown reinforcement, in which the carcass reinforcement comprises at least one, and preferably at least two, circumferential alignments of reinforcement elements of high elasticity modulus and in which the means for anchoring said reinforcement elements, within each bead comprise circumferentially oriented reinforcement elements axially bordering said circumferential alignments of said reinforcement elements constituting the carcass reinforcement, said reinforcement elements constituting the carcass reinforcement and said circumferentially oriented reinforcement elements being separated by a bonding rubber mix of very high elasticity modulus, said circumferentially oriented reinforcement elements being cables, said cables having a penetrability of between 80 and 100%, the breaking load of said cables being greater than 150 daN and said cables having an elongation at break greater than 4%.

The reinforcement elements constituting the carcass reinforcement may be any type of reinforcement elements in cord form, capable of reinforcing a given matrix, for example a rubber matrix. As reinforcement elements, mention will be made, for example, of multifilament yarns, these yarns possibly being twisted on themselves or not, of unit threads such as cylindrical or oblong single cords, with or without a twist on themselves, cabled yarns or plied yarns ("cords") obtained by cabling or plying operations on these unit threads or these yarns, such reinforcement elements possibly being hybrid ones, that is to say, composite ones, comprising elements of different natures.

"Plied yarn" (or "folded yarn") is understood to mean a reinforcement element formed of two single yarns or more assembled together by plying operations; these single yarns, which are generally formed of multifilament yarns, are first of all plied individually in one direction (S or Z direction of twist) during a first plying stage, then twisted together in the opposite direction (Z or S direction of twist, respectively) during a second plying stage.

The penetrability according to the invention is the ability of the rubber to penetrate the free zones of a cable, that is to say the zones which do not comprise material; it is expressed as a percentage of said free zones occupied by rubber after curing and determined by an air permeability test.

This air permeability test makes it possible to measure a relative index of air permeability. It is a simple way of indirectly measuring the degree of penetration of the cable by a rubber composition. It is performed on cables extracted directly, by decortication, from the vulcanized rubber plies which they reinforce, and which therefore have been penetrated by the cured rubber.

The test is carried out on a given length of cable (for example 2 cm) as follows: air is sent to the entry of the cable, at a given pressure (for example 1 bar), and the quantity of air at the exit is measured, using a flow meter; during the measurement, the sample of cable is locked in a seal such that only the quantity of air passing through the cable from one end to the other, along its longitudinal axis, is taken into account by the measurement. The flow rate measured is lower, the higher the amount of penetration of the cable by the rubber.

Surprisingly, the Applicant noted that the fact of having replaced, in the tire according to the invention, anchoring of the carcass reinforcement by means of circumferential cords coupled to the reinforcing threads of the carcass reinforcement by means of a bonding rubber mix of very high elasticity modulus with anchoring by means of cables such as defined previously makes it possible to improve the yield of the manufacturing process. Furthermore, it would appear that the use of the cables defined according to the invention makes it possible to retain compactness of the beads of the tire for satisfactory rigidity for the applications considered.

In fact, it would appear that selecting cables having a penetration ability such as described permits hooking in the uncured state of the cables in the zone of the bead satisfactorily without any risk of having said cables become detached, even partially, during the stages of manufacture of the later tire which are carried out before curing said tire.

Furthermore, the values of elongation at break permit optimization of the effectiveness of working of the cables, because in the techniques of manufacture on a toroidal core, the cables are wound circumferentially to form several radially concentric turns permitting better anchoring between the cables and the reinforcement elements of the carcass reinforcement. The values of elongation at break of the cables according to the invention permit deformation of said cables which results in a greater effectiveness yield of said turns. In other words, the deformation of said cables according to the invention makes it possible to obtain a more homogeneous distribution, according to the winding length, of the stresses withstood by one and the same winding of such a cable which does not have said elongation characteristics.

Consequently, the combination of the elongation at break of the cables and their breaking load according to the invention makes it possible to retain a compactness of the bead which is satisfactory for the intended application.

According to a preferred embodiment of the invention, the breaking load of the cables is less than 400 daN. A breaking load greater than such a value may result, in particular in the case of an overall value of breaking load of the fixed bead and of an imposed cable diameter, in a reduction in the number of turns of said cables and hence in a reduction in the anchoring height between the reinforcement elements of the carcass structure and the circumferentially oriented cables. Such a reduction in the anchoring height may be detrimental to the quality of said anchoring. Furthermore, if the increase in the breaking load of the cables is combined with an increase in the diameter of said cables, this may create problems of bulking in particular in terms of widening the bottom zone.

More preferably still, the elongation at break of the cables is less than 8%. A greater elongation could result in tires having a rigidity of the beads, for high pressures, which is not sufficient to guarantee the holding of said tire on a rim and to guarantee the transmission of the braking torques.

The values of elongation at break of the cables according to the invention are advantageously obtained by heat treatments of the cables which are referred to as "high-elongation" treatments. Such treatments known to the person skilled in the art are described for example in European Patent EP 0 751 015.

According to one advantageous embodiment of the invention, the cables according to the invention comprise a conventional adherent coating such as a brass coating so as to improve the adhesion between said cables and the rubber mixes.

According to a preferred embodiment of the invention, the bonding rubber mix of very high elasticity modulus has a secant modulus of extension at 10% greater than 20 MPa and preferably greater than 30 MPa. This layer may also have a Shore A hardness greater than 70.

According to one advantageous embodiment of the invention, the reinforcement elements constituting the carcass reinforcement are, for example, made of aromatic polyamide or reinforcement elements such as those described in patent application WO 02/085646. These may be cords or cables.

More advantageously still, the carcass reinforcement of the tires according to the invention comprises two or three circumferential alignments of reinforcement elements.

Two circumferential alignments are necessary in order to withstand the very high mechanical stresses which occur, but it is preferable not to exceed a number of three alignments in order not to increase harmfully the flexural rigidity of the sidewalls.

Advantageously, each circumferential alignment of the carcass reinforcement, within each bead, is bordered axially internally and axially externally by circumferentially oriented cables.

The circumferentially oriented cables preferably have a modulus of extension greater than that of the reinforcement elements of the carcass reinforcement. They are preferably selected from among the group consisting of carbon, tungsten, high-modulus aramid or steel reinforcing threads.

According to another characteristic of the tire according to the invention, considering $\Sigma R_I$ as being the total of the rigidities of extension of the circumferentially oriented cables arranged axially internally relative to the carcass reinforcement, and considering $\Sigma R_E$ as being the total of the rigidities of extension of the circumferentially oriented cables arranged axially on either side of the carcass reinforcement, then:

$$0.6 \leq \frac{\sum R_I}{\sum R_E} \leq 1.5$$

$$0.7 \leq \frac{\sum R_I}{\sum R_E} \leq 1.3$$

and preferably:

Keeping within these limits for the ratio between the total rigidity of extension of the circumferentially oriented cables arranged to the inside of the carcass reinforcement in each bead and the total rigidity of extension of the circumferentially oriented cables arranged to the outside of the carcass reinforcement has the advantage of making the stressing of the cables oriented circumferentially in the bead more homogeneous, whatever their position.

According to another preferred characteristic of the invention, the outer surface of the bead of the tire according to the invention comprising a seat followed by a frustoconical wall of substantially radial orientation adjacent radially internally to a wall of cross-section substantially in the form of an arc of a circle and of centre C arranged externally relative to the bead, these walls being intended to bear against the hook and the flange of a suitable rim, considering a line CD, passing through the bead of the tire, forming an angle $\alpha = +45 \pm 5$ degrees relative to the axis A of the tire, all of the circumferentially oriented cables are arranged at a radial distance from the axis of the tire less than or equal to such radial distance of this line CD. This line CD defines substantially an embedding zone which is very rigid, in which the deformations are very much reduced and a zone of flexure radially above CD. The fact that all the circumferentially oriented cables are in the embedding zone reinforces the endurance of the bead.

Preferably, the bead of the tire according to the invention having an outer surface intended to come into contact with the corresponding surface of the seat and of the hook of the rim, after mounting on said rim and inflation of the tire, the contact zone between the outer surface of the bead and the rim extends at least as far as point B of the hook of maximum radius $R_J$.

Advantageously, $\Phi$ being the diameter of the circumference of the outer surface of the bead intended to come to bear against the circumference of the hook of the rim of maximum radius $R_J$, then:

$$\Phi = 2(R_J - \epsilon)$$

with $\epsilon$ being between 0.5 and 2 mm.

This enables the bead to be "seated" properly on the seat and the hook of the rim and has the advantage of limiting the curvature of the circumferential alignments of the carcass reinforcement during travel, particularly in the contact area.

According to one advantageous embodiment, the reinforcement elements of the carcass reinforcement form forward and return paths arranged adjacently, with, at the level of each bead, loops connecting one forward path to one return path each time.

The crown reinforcement of the aircraft tire according to the invention preferably comprises at least one working block with one or more layers of reinforcement elements which are parallel in each layer, oriented substantially circumferentially; these are advantageously reinforcement elements made of aromatic polyamide, or reinforcement elements such as those described in patent application WO 02/085646.

"Substantially circumferential orientation" is understood to mean an orientation which does not diverge by more than five degrees from the circumferential direction.

If necessary, the crown reinforcement comprising a central zone and two lateral zones, the working block furthermore comprises at least two layers of reinforcement elements, oriented substantially circumferentially, arranged axially on either side of the median plane of the tire in the lateral zones of said crown. These layers make it possible to withstand the forces due to centrifugation at high speed. They are preferably arranged radially internally relative to the two layers of circumferentially oriented reinforcement elements of the working block. These two reinforcement layers have the advantage of increasing the wrapping of the lateral zones of the crown without increasing the thickness thereof.

The crown reinforcement may further comprise at least two layers of reinforcement elements, which elements are parallel to each other in each layer and crossed from one layer to the next, forming an angle $\alpha$, of between 5° and 35° with the circumferential direction for reinforcing the drift rigidity of the tire. The reinforcement elements are for example reinforcement elements such as those described in patent application WO 02/085646.

The crown reinforcement may also comprise, arranged radially externally relative to the working block, a protective crown layer. This protective layer preferably extends axially beyond the axial width of the layers of reinforcement elements of circumferential orientation.

BRIEF DESCRIPTION OF THE DRAWINGS

Other advantageous details and characteristics of the invention will become apparent hereafter from the description of examples of embodiment of the invention with reference to FIGS. 1 to 6, which represent:

FIGS. 1 to 6 are not shown to scale in order to simplify understanding thereof.

DESCRIPTION OF A PREFERRED EMBODIMENT

Figure 1:
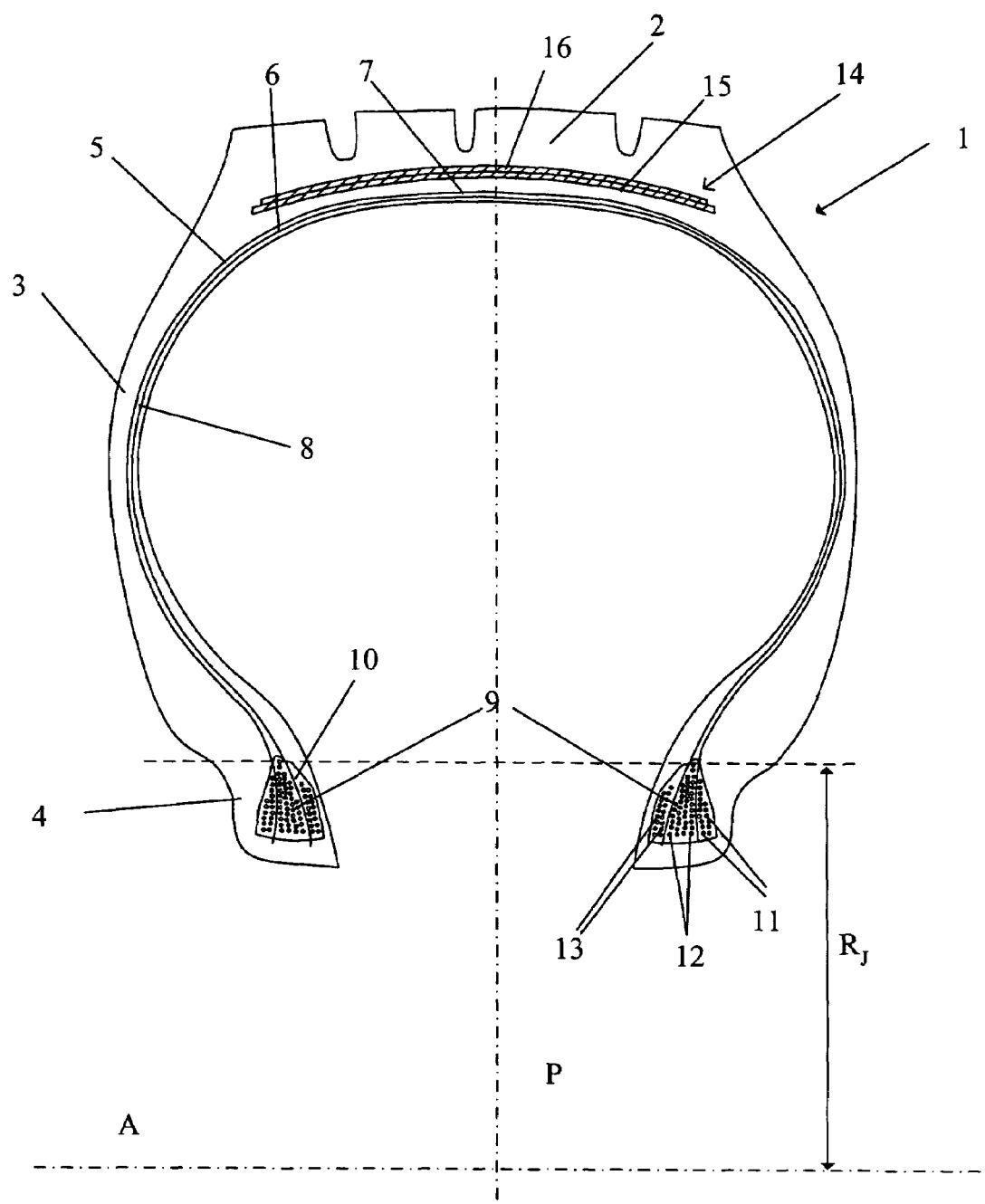
FIG. 1, a diagram of an axial section through a tire according to the invention, FIG. 2, a diagram of a section through a cable according to the invention, FIG. 3, a perspective view showing the arrangement of part of the reinforcing threads of the carcass reinforcement, FIG. 4, a diagram of a bead according to a second embodiment of the invention, FIG. 5, a diagram of an axial section through a tire according to a variant embodiment of the invention shown in FIG. 1, FIG. 6, a diagram of an axial section through a tire according to another variant embodiment of the invention shown in FIG. 1.

The aircraft tire 1 shown diagrammatically in axial half-section in FIG. 1 comprises a crown 2, two sidewalls 3 and two beads 4. A carcass reinforcement 5 extends from one bead 4 to the other and is formed of two circumferential alignments 6 and 7 of reinforcement elements. The circumferential alignments of the reinforcement elements 6 and 7 are oriented radially in the sidewalls 3 and are formed of reinforcement elements of aromatic polyamide or aramid. The reinforcement elements are arranged parallel to one another and are separated by a layer of mix 8 the nature and the modulus of which are adapted according to their position in the tire.

Anchoring of the two circumferential alignments 6 and 7 is provided in the beads 3 by alignments or "stacks" 9 of circumferentially oriented wound cables arranged axially on either side of each circumferential alignment of the reinforcement elements 6 and 7. Each alignment or stack 9 of circumferentially oriented cables may be obtained by helical winding of a cable. The radial reinforcement elements of the carcass reinforcement and the circumferentially oriented cables are separated from each other by a bonding rubber mix 10 of very high elasticity modulus in order to avoid any direct contact of one reinforcement element with another.

This bonding rubber mix 10 has a Shore A hardness greater than 70. Its secant modulus of extension at 10% may also be greater than 20 MPa and preferably greater than 30 MPa. The tension which develops in the radial reinforcement elements upon inflation of the tire 1 is taken up in particular by the lateral adhesion between each circumferential alignment 6 and 7 and the stacks 9 of circumferentially oriented cables. This bead structure ensures excellent anchoring, which remains very effective even for the very high inflation pressures of aircraft tires, which are greater than 12 bar and possibly attain 25 bar in certain specific applications.

The stacks 9 of circumferentially oriented cables are distributed into three groups, two stacks 11 arranged axially externally to the carcass reinforcement 5 on the outside of the tire, two stacks 13 arranged axially internally relative to the carcass reinforcement 5, on the inside of the tire and four stacks 12 arranged between the two circumferential alignments 6 and 7 of the carcass reinforcement 5.

The invention may also provide for the placement of the cones of rubber mixes axially between the carcass reinforcement and the stacks 9 of circumferentially oriented cables to permit placement of the circumferentially oriented cables such that the axial distance between these and the carcass reinforcement increases in the radial direction. This variant embodiment is not illustrated in the Figures. Such placement of the cables has been described in French application FR 0209355.

In the case of the tire described, considering the number of turns arranged internally and externally relative to the carcass reinforcement, then: $\Sigma R_I/\Sigma R_E \cong 1.24$.

This has the advantage of homogenizing the mechanical stress on the circumferentially oriented cables in the bead.

It may also be noted that the number of turns of the stacks decreases gradually with distance relative to the axis of rotation A of the tire 1. The result is a substantially conical form of the arrangement of the circumferentially oriented cables. This has the advantage of greatly stabilizing the beads 4 upon inflation of the tire and upon passage into the contact area during operation.

All the turns of the stacks 9 are embedded in the rubber mix 10 of very high elasticity modulus to ensure good taking-up of the forces due to the inflation pressure and hence excellent anchoring of the carcass reinforcement in the beads 4.

Figure 2:
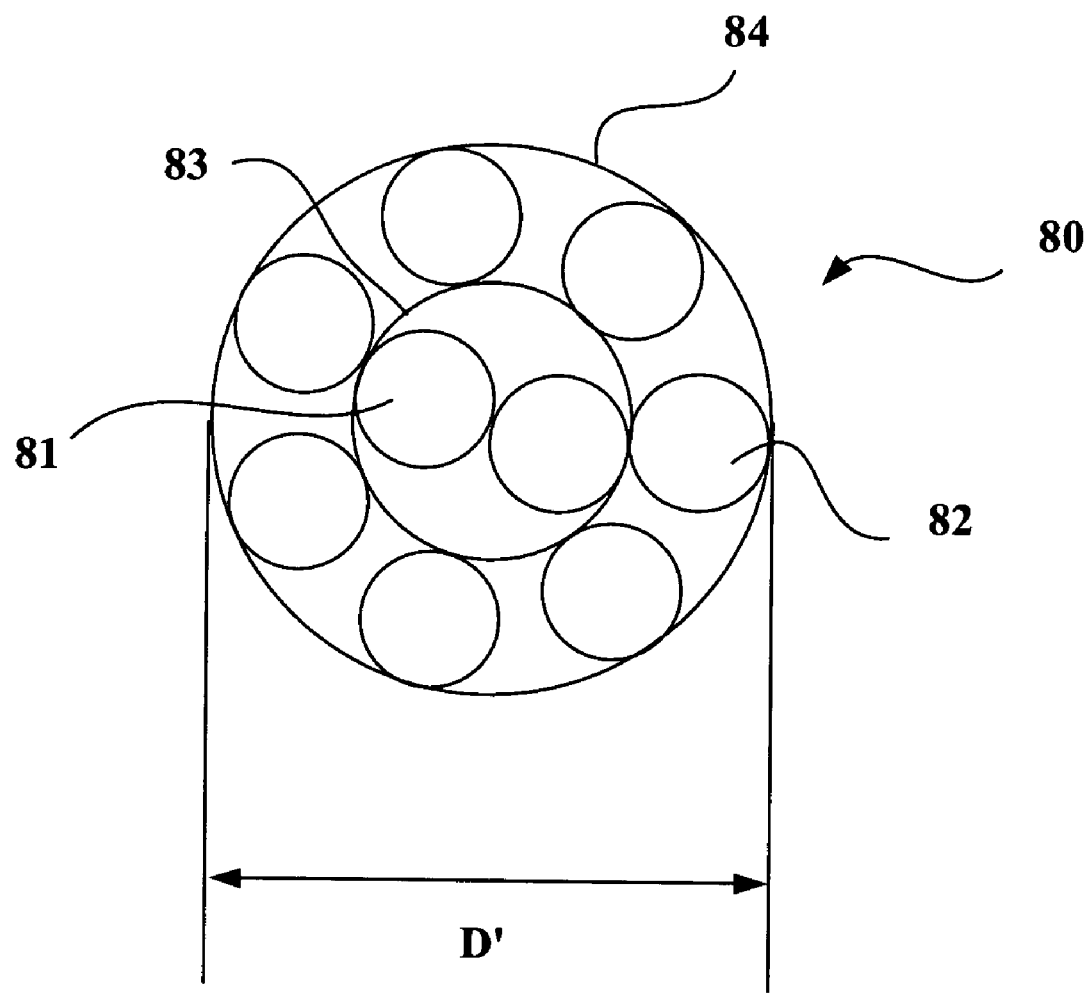

FIG. 2 shows a cable 80 used, according to the invention, in a circumferential winding as anchoring means for the reinforcement elements of the carcass reinforcement. The cable 80 is a layered cable of formula 9.35, that is to say formed of 9 elementary wires of a diameter of 35/100 mm; the cable 80 satisfies the formula 2+7 with two wires 81, constituting the first layer, twisted together to form a plied yarn, and seven wires 82, forming the outer layer, wound together in a helix around the first layer. FIG. 2 illustrates this winding by showing the seven wires 82 in contact with the circle 83 representing the space occupied by the plied yarn formed of the two wires 81 of the first layer. The wires 81, 82 are made of steel having a carbon content of between 0.7 and 0.9%. The wires have been treated beforehand to comprise a brass coating which promotes adhesion of the wire to the rubber. The wires have a work-hardening ratio of less than 3.5. The cable has a total diameter D', corresponding the diameter of the circle 84 circumscribed on the outer layer, equal to 1.35 mm. The measurement of the penetrability of this cable effected according to the method described previously resulted in a value of 100%. The breaking load of the cable is equal to 198 daN and its elongation at break is 5.4%. The elongation at break is obtained after a heat treatment such as the one mentioned above; the heat treatment makes it possible to increase the elastic and plastic elongations which are added to the structural elongation. The latter is equal to 0.1% for the cable 80 of formula 9.35.

Another layered cable, of formula 13.35, was tested; this cable is formed of 13 elementary wires of a diameter of 35/100 mm and of formula 4+9, with 4 wires, constituting the first layer, twisted together to form a plied cable, and 9 wires, forming the outer layer, wound together in a helix around the first layer. The elementary wires are the same as in the previous case. The measurement of the penetrability of this cable effected according to the method described previously resulted in a value of 80%. The breaking load of the cable is equal to 282 daN and its elongation at break is 6.4%. It should be noted that the structural elongation of this cable of formula 13.35 is 0.2%.

Figure 3:
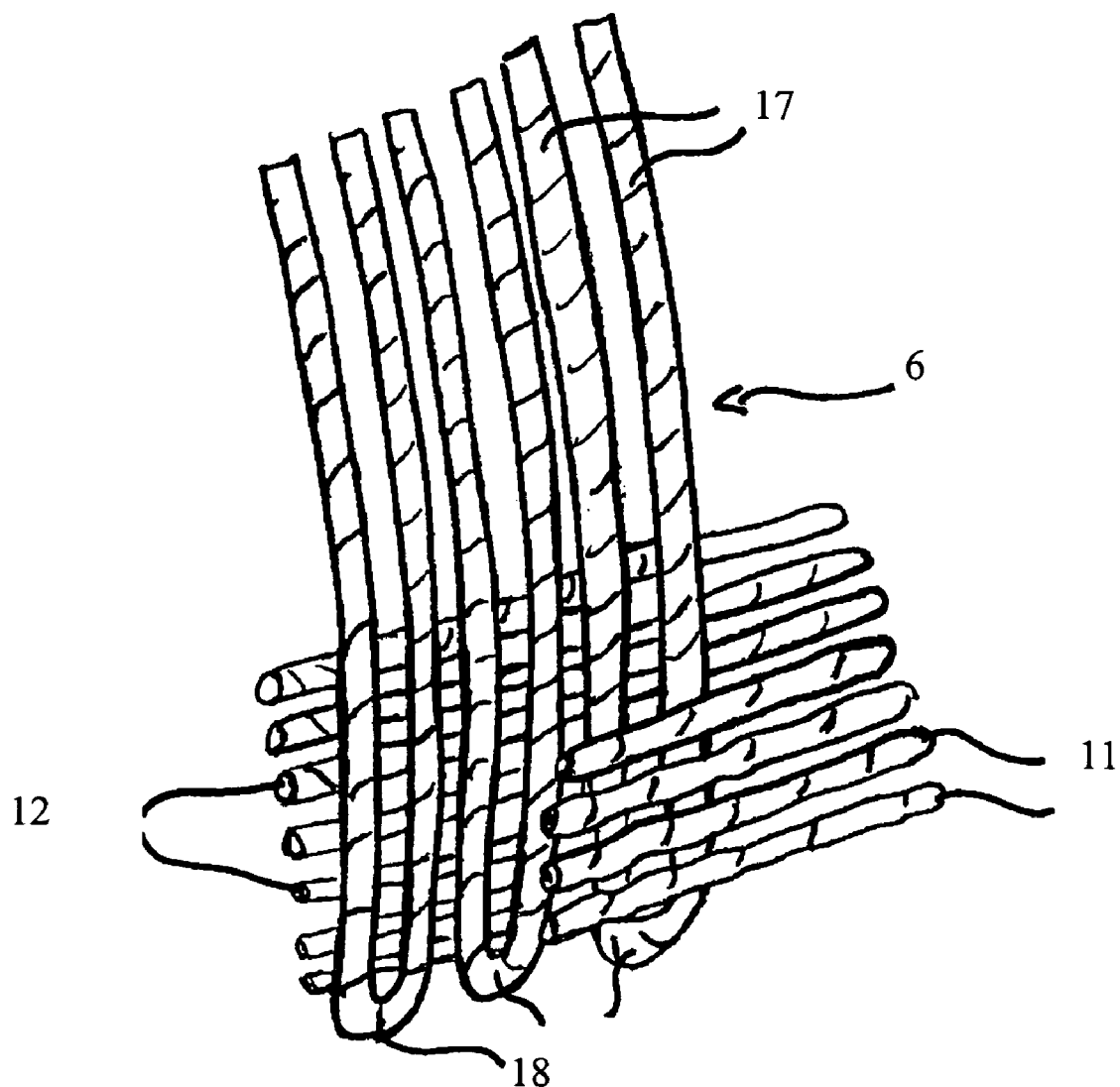

FIG. 3 is a perspective view of one of the circumferential alignments of the reinforcement elements, alignment 6, in which only the reinforcement elements are shown. In this FIG. 3, there can be seen the circumferential alignment 6 of the reinforcement elements of the carcass reinforcement which is formed of portions of reinforcement elements 17. At their radially lower ends, the portions of reinforcement elements 17 form juxtaposed loops 18, located in the bead 4. These loops 18 are adjacent and do not overlap. Axially on either side of the circumferential alignment 6 of the reinforcement elements of the carcass reinforcement, are shown only the stacks 11 and 12, of circumferentially oriented reinforcement elements, directly adjacent to this alignment 6. For clarity of the drawing, only the circumferential alignment 6 of reinforcement elements and two stacks have been shown, but the circumferential alignment 7 of reinforcement elements of the carcass reinforcement has the same arrangement of the portions of reinforcing threads 17.

Figure 4:
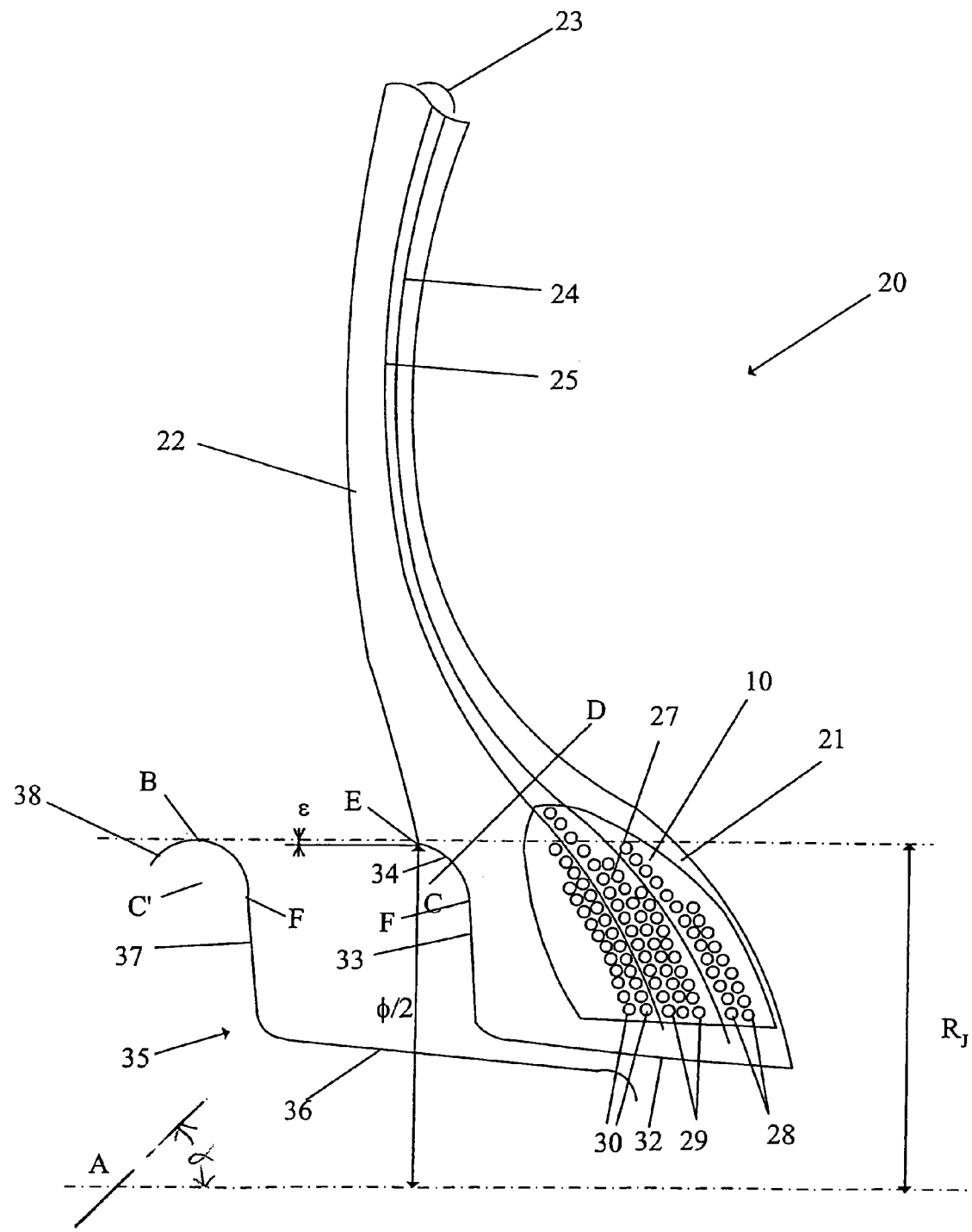

FIG. 4 illustrates a bead 21 and a sidewall 22 of a second embodiment of a tire 20 according to the invention in which the carcass reinforcement 23 is formed of two circumferential alignments, 24, 25 of reinforcement elements of aromatic polyamide or aramid. In the bead 21 there are arranged stacks 27 of cables of circumferential orientation. These stacks 27 are here separated into three groups. There are found successively axially from the inner side of the bead towards the outer side, two stacks 28 arranged internally relative to the circumferential alignment of reinforcement elements of the carcass reinforcement 24, three stacks 29 arranged between the circumferential alignments of reinforcement elements of the carcass reinforcement 24 and 25, and two stacks 30 arranged externally relative to the circumferential alignment of reinforcement elements of the carcass reinforcement 25.

As previously, the number of turns of circumferentially oriented cables is such that it is ensured that the total of the rigidities of extension of the stacks arranged externally relative to the carcass reinforcement is substantially of the same order as the total of the rigidities of extension of the stacks arranged internally relative to the carcass reinforcement 23.

The outer surface of the bead 21 comprises a seat 32, a frustoconical wall of substantially radial orientation 33 adjacent radially internally to a wall 34 the section of which is an arc of a circle EF of centre C. C is arranged to the outside of the bead 21. Considering the line CD which passes through the bead forming an angle $\alpha = +45 \pm 5$ degrees relative to the axis of rotation A of the tire (this angle is determined when the tire is mounted on its rim), it will be noted that all the circumferentially oriented reinforcement elements 27 are arranged at a radial distance from the axis A less than or equal to this line CD. This line CD defines substantially a very rigid embedding zone, in which the deformations are very much reduced and a zone of flexure radially above CD. The fact that all the circumferentially oriented reinforcement elements are in the embedding zone reinforces the endurance of the bead.

This outer surface of the bead is intended to come to bear against the wall of a rim 35 whose outer profile is also shown in FIG. 4. This profile comprises the seat 36 and the substantially radial wall of the hook 37 followed by the flange 38. The flange 38 has a cross-section in the shape of an arc of a circle of centre C'. The highest point of diameter is B, of radius $R_j$. The point E arranged on the axially outer surface of the bead 21 is intended to come into contact with substantially the point B. When the tire is mounted on the rim 35, the surfaces 34 are 38 are homocentric, that is to say that their centers C and C' are identical. Point E is located on a circumference of diameter Φ. We have the relationship:

$$\Phi = 2(R_j - \epsilon)$$

with ε being between 0.5 and 2 mm.

This slight offset of the point E between its free position and its position mounted on the rim, in contact with B, enables the bead to be slightly extended when it is mounted on the rim and promotes the quality of the contact obtained. This contact as far as point E reinforces the stability of the bead during the pressurization of the tire and during passage into the contact area during operation. Consequently, it will be noted that the circumferential alignments of the carcass reinforcement are substantially less stressed in compression upon passage into the contact area, contrary to what happens for aircraft tires of conventional structure.

FIG. 1 also shows a first example of a crown reinforcement 14. This is formed of a working block comprising two layers of reinforcement elements 15 and 16 of substantially circumferential orientation obtained by helical winding of at least one reinforcement element. The number of layers of reinforcing thread and the laying pitch are adapted according to the dimension of the tire and its conditions of use. This embodiment of a crown reinforcement has the advantage of providing very effective wrapping which minimizes the variation in the dimensions of the tire upon inflation and at high speed. It will be noted that the change in the profile may be three to four times less than for a conventional aircraft tire such as a 30×8.8R15 AIRX. This excellent wrapping also has the advantage of not greatly extending the mixes forming the tread of the crown of the tire. The surface cracking of the tread due to the ozone present in the air is greatly reduced.

Figure 5:
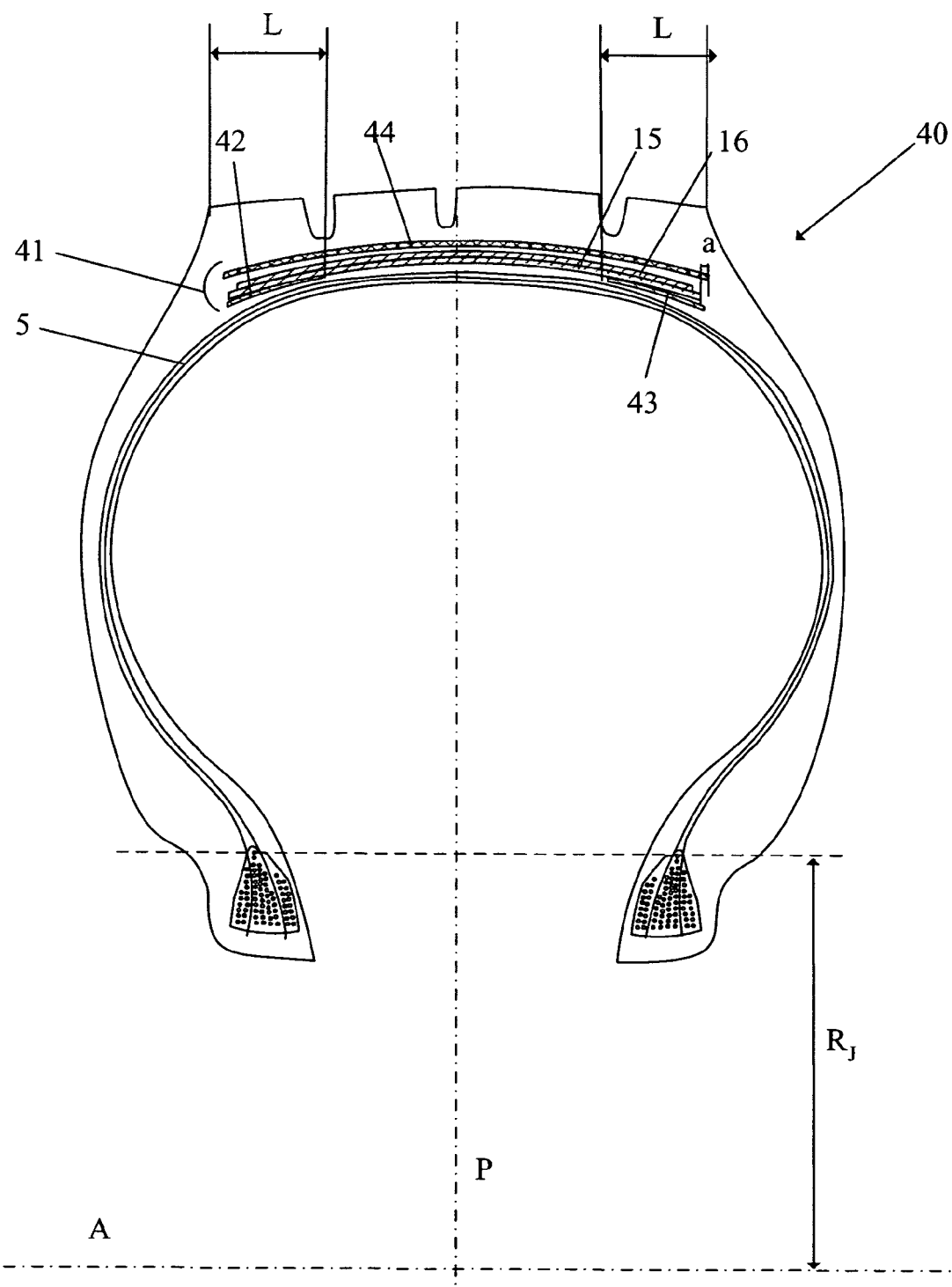

The crown reinforcement 41 of the tire 40 shown in FIG. 5 comprises, as previously, two layers of reinforcement elements of substantially circumferential orientation 15 and 16, and is finished off by two layers 42 and 43 of substantially circumferentially oriented reinforcement elements, arranged axially on either side of the median plane of the tire in the lateral zones of the crown. They make it possible to reinforce the wrapping of the lateral zones L of the crown. The layers 42 and 43 are arranged radially between the layers 15 and 16 and the carcass reinforcement 5.

The reinforcement 41 is also finished off by a protective crown layer 44 arranged radially externally relative to the other plies of the crown reinforcement 41. This protective crown layer may be formed of metallic reinforcement elements which undulate so that they are not stressed in normal operation. It should be noted that this protective layer extends axially beyond the layers 15 and 16 on either side of the median plane P of the tire by an axial distance a.

Figure 6:
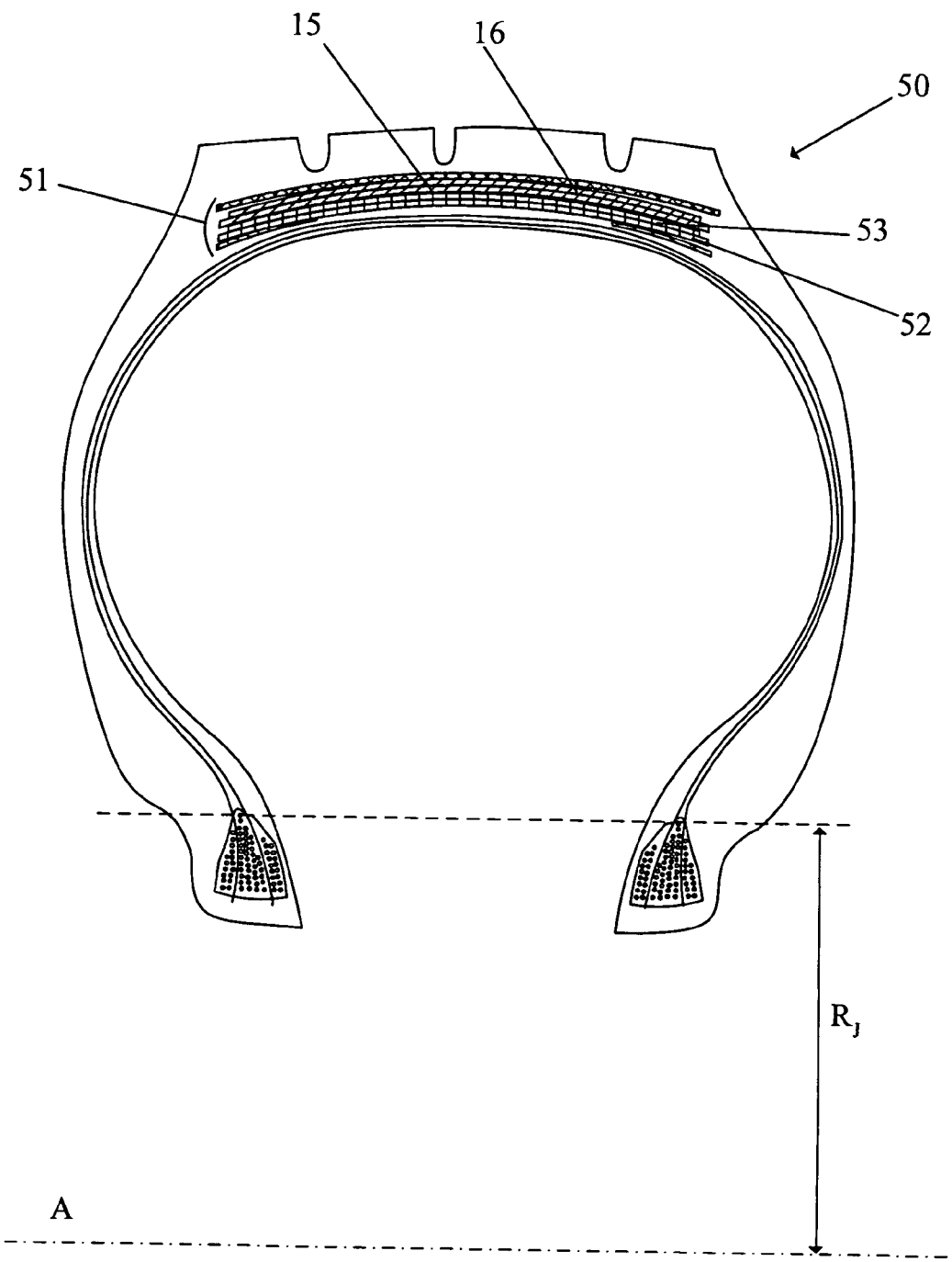

FIG. 6 shows a tire 50 with a crown reinforcement 51 furthermore comprising two layers 52, 53 of reinforcement elements, parallel to each other in each layer and crossed from one layer to the next, forming with the circumferential direction an angle α, of between 5° and 35°. These two layers are arranged radially below the layers of circumferential reinforcement elements 15 and 16. They increase the drift thrust of the tire 30 relative to that of the tire 40.

A tire according to the invention of dimension 30×8.8 R 15 was tested which comprised:
as carcass reinforcement two circumferential alignments of reinforcement elements;
as circumferentially oriented cables steel cables such as those described in FIG. 2, of formula 9.35, and distributed in 7 stacks 27 (as illustrated in FIG. 4):
2 axially innermost stacks with 12 and 15 turns,
3 stacks between the circumferential alignments 24 and 25 with 17, 14 and 16 turns,
2 axially outermost stacks with 11 and 7 turns.
a crown reinforcement with two layers of reinforcement elements oriented substantially circumferentially formed of plied cables.

The layer of mix of very high elasticity modulus had a secant modulus of extension of 45 MPa and a Shore A hardness of 90.

This tire underwent bursting-resistance tests and the maximum pressures measured were of the order of 58 bar. It is also characterized by an amount of elongation of its development between zero pressure and its operating pressure of 15 bar of the order of 1.5%. This tire also successfully underwent takeoff tests similar to the standardized tests for certification of aircraft tires.

The building of the tire according to the invention may advantageously be effected on a rigid core which imposes the form of its inner cavity, such as those described by EP 242 840 or EP 822 047, which are incorporated in the present application by reference. There are applied to this core, in the order required by the final architecture, all the constituents of the tire, which are arranged directly in their final position, without undergoing shaping at any moment of the building operation. The curing takes place on the core, the latter only being removed after the vulcanization phase has finished.

This method of manufacture has the advantage of greatly reducing, or even eliminating, the pre-stresses imposed on the reinforcing threads, particularly those oriented at 0°, during the traditional shaping phases.

The casing may also be partially cooled on the core in order to keep the reinforcement elements in the state of deformation imposed during laying.

Equivalently, it is also possible to manufacture the tire on a drum such as described in WO 97/47 463 or EP 0 718 090, provided that the blank of the tire is shaped before laying the circumferentially oriented cables.

The circumferentially oriented cables may also be laid on a form having a geometry identical to the form intended in the curing mould. The crown block is then assembled with the complementary blank of the tire using transfer techniques known to the person skilled in the art, then, still using known principles, the tire is fitted and pressurized by deploying a membrane inside the tire.

This embodiment also guarantees the absence of pre-stresses due to the shaping in the vulcanization press.

Whatever the manufacturing method selected, it would appear that the selection of the cables according to the invention laid in a circumferential orientation in the zone of the bead to anchor the reinforcement elements of the carcass reinforcement makes it possible to improve the manufacturing yields, because the selection of these cables permits hooking during their laying in the uncured state which is sufficient for them not to risk becoming detached or simply displaced before the curing phase.

The invention claimed is:

1. An aircraft tire, the inflation pressure of which is greater than 9 bar and the deflection of which is greater than 30%, comprising a crown, two sidewalls and two beads, a carcass reinforcement anchored in the two beads and a crown reinforcement, in which the carcass reinforcement comprises at least one circumferential alignment of carcass reinforcement elements and in which the carcass reinforcement elements are anchored within each bead by circumferentially oriented reinforcement elements axially bordering said at least one circumferential alignment of said carcass reinforcement elements, said carcass reinforcement elements and said circumferentially oriented reinforcement elements being separated by a bonding rubber mix of very high elasticity modulus, wherein said circumferentially oriented reinforcement elements are cables, wherein said cables have a penetrability of between 80 and 100%, wherein the breaking load of the cables is greater than 150 daN and wherein said cables have an elongation at break greater than 4%.

2. An aircraft tire according to claim 1, wherein the breaking load of the circumferentially oriented cables is less than 400 daN.

3. An aircraft tire according to claim 1, wherein the elongation at break of the circumferentially oriented cables is less than 8%.

4. An aircraft tire according to claim 1, wherein said circumferentially oriented cables are formed of cords selected from among the group consisting of carbon, tungsten, high-modulus aramid or steel reinforcing threads.

5. An aircraft tire according to claim 1, the circumferentially oriented cables comprising metal, wherein said circumferentially oriented cables are heat-treated.

6. An aircraft tire according to claim 1, wherein the surface of the circumferentially oriented cables comprises an adherent coating, such as a brass coating.

7. An aircraft tire according to according to claim 1, wherein each circumferential alignment of said carcass reinforcement elements within each bead, is bordered axially internally and axially externally by said circumferentially oriented cables.

8. An aircraft tire according to claim 7, wherein, considering $\Sigma R_I$ as being the total of the rigidities of extension of the circumferentially oriented cables arranged axially internally relative to the carcass reinforcement, and considering $\Sigma R_E$ as being the total of the rigidities of extension of the circumferentially oriented cables arranged axially on either side of the carcass reinforcement, then:

$$0.6 \leq \frac{\sum R_I}{\sum R_E} \leq 1.5.$$

9. An aircraft tire according to claim 8, wherein:

$$0.7 \leq \frac{\sum R_I}{\sum R_E} \leq 1.3.$$

10. An aircraft tire according to claim 1, in which, the outer surface of the beads comprising a seat, a frustoconical wall of substantially radial orientation adjacent radially internally to a wall the section of which is an arc of a circle EF of centre C, and considering a line CD passing through the bead, forming an angle $\alpha=+45\pm5$ degrees relative to the axis of rotation A of the tire, wherein each of the circumferentially oriented cables is arranged at a radial distance from the axis of rotation A which is less than or equal to the radial distance of the corresponding part of said line CD.

11. An aircraft tire according to claim 1, in which, said bead having an outer surface intended to come into contact with the corresponding surface of the seat and of the hook of a rim, after mounting on said rim and inflation of said tire, wherein the contact zone between said outer surface of said bead and said rim extends at least as far as point B of the hook of maximum radius $R_J$.

12. An aircraft tire according to claim 11, in which, $\Phi$ being the diameter of the circumference of the outer surface of the bead intended to come to bear against the circumference of the hook of the rim of maximum radius $R_J$, wherein:

$$\Phi = 2(R_J - \epsilon)$$

with $\epsilon$ being between 0.5 and 2 mm.

13. An aircraft tire according to claim 1, wherein said reinforcement elements of the carcass reinforcement form forward and return paths arranged adjacently, and wherein at the level of each bead, loops connect one forward path to one return path each time.

14. An aircraft tire according to claim 1, wherein the crown reinforcement comprises at least one working block with at least two layers of reinforcement elements which are parallel in each layer, oriented substantially circumferentially.

15. An aircraft tire according to claim 14, in which, said crown comprising a central zone and two lateral zones, wherein said working block furthermore comprises at least two layers of substantially circumferentially oriented reinforcement elements of high elasticity modulus, arranged axially on either side of the median plane of the tire in the lateral zones of said crown.

16. An aircraft tire according to claim 15, wherein said at least two layers of substantially circumferentially oriented reinforcing elements of high elasticity modulus are arranged radially beneath said at least two layers of circumferentially oriented reinforcing elements.

17. An aircraft tire according to claim 14, wherein said working block further comprises at least two layers of reinforcement elements, which elements are parallel to each other in each layer and crossed from one layer to the next, forming an angle $\alpha$, of between 5° and 35°, with the circumferential direction.

18. An aircraft tire according to claim 14, wherein said crown reinforcement furthermore comprises, arranged radially externally relative to said working block, a protective layer extending axially beyond the axial width of said layer or layers of reinforcement elements of circumferential orientation.

19. An aircraft tire according to claim 1, wherein the bonding rubber mix of very high elasticity modulus has a secant modulus of extension at 10% greater than 20 MPa and preferably greater than 30 MPa.

20. An aircraft tire according to claim 1, wherein the bonding rubber mix of very high elasticity modulus has a Shore A hardness greater than 70.

* * * * *